United States Patent [19]
Kline et al.

[11] Patent Number: 5,868,075
[45] Date of Patent: Feb. 9, 1999

[54] METHOD AND APPARATUS FOR IMAGING A SEAMLESS PRINT MEDIUM

[75] Inventors: John F. Kline, Londonderry; Frank G. Pensavecchia, Hudson; Keith V. Robb, Wilton, all of N.H.

[73] Assignee: Presstek, Inc., Hudson, N.H.

[21] Appl. No.: 807,017

[22] Filed: Feb. 26, 1997

[51] Int. Cl.$^6$ .................................................. B41C 1/04
[52] U.S. Cl. ..................... 101/467; 101/401.1; 101/485; 347/247; 347/250; 358/299; 358/448
[58] Field of Search .................. 101/401.1, 463.1, 101/467, 485; 358/297, 298, 299, 448, 450; 347/237, 247, 250

[56] References Cited

U.S. PATENT DOCUMENTS

| | | | |
|---|---|---|---|
| 3,580,995 | 5/1971 | Klensch | 358/485 |
| 3,604,846 | 9/1971 | Behane et al. | 358/298 |
| 3,689,693 | 9/1972 | Cahill et al. | 358/296 |
| 3,928,718 | 12/1975 | Sagae et al. | 358/296 |
| 4,009,332 | 2/1977 | Van Hook | 358/410 |
| 4,057,838 | 11/1977 | Doelves et al. | 358/299 |
| 4,208,666 | 6/1980 | Paranjpe | 347/104 |
| 4,347,785 | 9/1982 | Chase et al. | 101/401.1 |
| 4,395,946 | 8/1983 | Price | 101/152 |
| 4,459,604 | 7/1984 | Kudelski et al. | 347/161 |
| 4,500,929 | 2/1985 | Buechler | 101/494 |
| 4,524,364 | 6/1985 | Bain et al. | 347/39 |
| 4,574,291 | 3/1986 | Wimmer | 347/16 |
| 4,591,880 | 5/1986 | Mitsuka | 347/250 |
| 4,596,468 | 6/1986 | Simeth | 356/400 |
| 4,652,159 | 3/1987 | Nagai | 400/322 |
| 4,707,683 | 11/1987 | Yao | 341/1 |
| 4,718,340 | 1/1988 | Love, III | 101/467 |
| 4,729,310 | 3/1988 | Love, III | 101/466 |
| 4,731,662 | 3/1988 | Hicks et al. | 347/116 |
| 4,739,416 | 4/1988 | Manian | 358/302 |
| 4,745,487 | 5/1988 | Nishikawa | 358/289 |
| 4,814,797 | 3/1989 | Haneda et al. | 347/119 |
| 4,819,018 | 4/1989 | Moyroud et al. | 396/549 |
| 4,829,326 | 5/1989 | Emmett et al. | 347/116 |
| 4,833,486 | 5/1989 | Zerillo | 101/467 |
| 4,852,485 | 8/1989 | Brunner | 101/211 |
| 4,884,080 | 11/1989 | Hirahara et al. | 346/46 |
| 4,893,135 | 1/1990 | Jamzadeh | 347/248 |
| 4,911,075 | 3/1990 | Lewis et al. | 101/453 |
| 4,919,047 | 4/1990 | Inouye et al. | 101/175 |
| 4,936,211 | 6/1990 | Pensavecchia et al. | 101/136 |
| 4,954,863 | 9/1990 | Harada et al. | 355/51 |
| 4,962,385 | 10/1990 | Zlotek | 347/232 |

(List continued on next page.)

FOREIGN PATENT DOCUMENTS

| | | |
|---|---|---|
| 0038497 | 10/1981 | European Pat. Off. . |
| 130028 | 1/1985 | European Pat. Off. . |
| 0150029 | 7/1985 | European Pat. Off. . |
| 0167352 | 1/1986 | European Pat. Off. . |
| 0298580A2 | 1/1989 | European Pat. Off. . |
| 2311678 | 9/1974 | Germany . |
| 3935549A1 | 4/1990 | Germany . |

OTHER PUBLICATIONS

Childress, L.S., "Continuously Variable Resolution Document Scanner and Film Plotter", *IBM Technical Disclosure Bulletin*, vol. 18, No. 8, Jan. 1976, pp. 2580–2581.

*Primary Examiner*—Stephen R. Funk
*Attorney, Agent, or Firm*—Cesari and McKenna, LLP

[57] ABSTRACT

A plate imaging apparatus and method for imaging a seamless printing member preferably loaded onto a rotating plate cylinder. The plate imaging apparatus moves a writing head in fixed increments in an axial direction relative to the plate cylinder. With the writing head fixed at a first axial position, the imaging apparatus causes a circumferential swath to be imaged onto the seamless printing member commencing from a first starting point. With the plate cylinder still rotating, the imaging apparatus then steps the writing head to the next axial position, thereby defining a second starting point once the writing head is ready to resume imaging that is offset from the first starting point. The imaging apparatus then causes a second circumferential swath to be imaged onto the seamless printing member commencing from the second starting point.

14 Claims, 4 Drawing Sheets

U.S. PATENT DOCUMENTS

| | | | |
|---|---|---|---|
| 4,992,890 | 2/1991 | Pinard et al. | 358/474 |
| 5,005,479 | 4/1991 | Lewis et al. | 101/467 |
| 5,062,364 | 11/1991 | Lewis et al. | 101/467 |
| 5,163,368 | 11/1992 | Pensavecchia et al. | 101/136 |
| 5,174,205 | 12/1992 | Kline et al. | 101/136 |
| 5,247,883 | 9/1993 | Kuwahara et al. | 101/401.1 |
| 5,274,397 | 12/1993 | Grover | 347/139 |
| 5,327,167 | 7/1994 | Pollard et al. | 347/251 |
| 5,385,092 | 1/1995 | Lewis et al. | 101/467 |
| 5,440,987 | 8/1995 | Williams et al. | 101/454 |
| 5,453,777 | 9/1995 | Pensavecchia et al. | 347/234 |
| 5,555,473 | 9/1996 | Seitz et al. | 358/299 |

METHOD AND APPARATUS FOR IMAGING A SEAMLESS PRINT MEDIUM

FIELD OF THE INVENTION

The present invention relates generally to the imaging of printing medium and, more specifically, to a method and apparatus for imaging a seamless printing medium.

BACKGROUND OF THE INVENTION

In offset lithography, an image is present on a printing plate as a pattern or "image" of ink-accepting (oleophilic) and ink-repellent (oleophobic) surface areas. In a typical sheet-fed offset press system, the imaged plate is loaded onto a plate cylinder, where it is inked. The plate is then brought into contact with the compliant surface of a blanket cylinder and the image is transferred (i.e., offset) to the blanket cylinder. The blanket cylinder, in turn, applies the image to the printing medium (e.g., paper sheets) which are brought into contact with the blanket cylinder by an impression cylinder.

Although the printing plates were traditionally imaged photographically, more recently, a number of electronic alternatives have been developed for placing the image onto the plate. These digitally controlled imaging devices include lasers that chemically alter or destroy one or more plate layers, ink jets that directly deposit ink-repellent or ink-accepting spots on a plate blank and spark or ion discharge devices which physically alter the topology of the plate blank. These various methods of imaging lithographic plates are described in detail in U.S. Pat. Nos. 3,506,779; 4,054,094; 4,347,785; 4,911,075 and 5,385,092, among others.

These methods, moreover, may be used with the printing plate already mounted to the plate cylinder. That is, a plate blank may be loaded onto the plate cylinder and then imaged, thereby reducing press set-up time considerably. The plate cylinder typically includes two plate clamps mounted to the cylinder that extend longitudinally along its surface. To load a plate blank onto the cylinder, the leading edge of the plate is secured to one clamp and the plate is wrapped around the surface of the cylinder. The trailing edge of the plate is then secured to the other clamp. The space immediately between the two clamps where no plate material is present is referred to as a "void" segment.

Referring to FIG. 1, a printing station 100 comprising a printing plate 112 loaded onto a plate cylinder 114 is typically controlled by a press computer 116. The computer 116 is interfaced with an image control unit 118, which, in turn, is interfaced, via drivers 120, to a moveable writing head 122. The control unit 118 regulates the timing with which imaging data is supplied to the drivers 120 and, ultimately, the writing head 122. The writing head 122 is mounted for movement on a lead screw 124 and a guide bar 126. That is, the writing head 122 travels axially along the lead screw 124 such that the head 122 remains adjacent to the printing plate 112.

To image the plate 112, the plate cylinder 114 is rotated at a constant angular velocity as shown by arrow A. As mentioned above, the cylinder 114 typically includes a void segment 128 having means, such as plate clamps (not shown), for securing the ends of the printing plate 112. An angular encoder 130 is coupled to one end of the cylinder 114 and the image control unit 118. While the cylinder 114 rotates, the writing head 122 receives signals from the drivers 120 and, in response, one or more imaging devices (not shown) disposed inside the head 122 will either activate or not activate, depending on the data received from the drivers 120. The writing head 122 will thus image a circumferential path or swath about the plate 112, preferably from a leading edge 112A of the plate 112 to a trailing edge 112B.

When the writing head 122 passes over the void segment 128, the imaging devices are idled and no imaging occurs. It is at this point that the writing head 122 is preferably advanced in the axial direction in preparation for further imaging of the plate 112. That is, a stepper motor 132 under the control of the press computer 116 preferably turns the lead screw 124 thereby shifting the axial position of the writing head 122 along the guide bar 126. The writing head 122 is thus indexed during the "down time" that the head 122 is over the void segment 128. Thus, by the time the leading edge 112A of the plate 112 once again passes under writing head 122, the writing head 122 has been moved to the appropriate axial location to begin the next imaging pass. This process is repeated, causing the image to "grow" axially along the plate, until the writing head 122 has scanned the entire surface of the printing plate 112. The imaged plate 112 is then ready for printing.

The presence of a void segment, although useful for advancing the writing head, can prove disadvantageous for certain printing applications. First, the void segment effectively reduces the amount of plate cylinder surface area that is otherwise available for printing. Furthermore, the void segment prevents printing of continuous, unbroken images along a web or strip of print material. This is often desirable in order to produce decorative items such as wallpaper. In addition, the presence of a void segment presupposes the use of clamping mechanisms for the ends of the plate as well as alignment and control assemblies to ensure proper registration of the plate on the cylinder, thereby increasing the complexity of the cylinder.

To overcome these limitations, efforts have been directed at producing what are known as "seamless" printing members. As set forth in U.S. Pat. No. 5,440,987, which is co-owned by the assignee of this application and incorporated herein by reference in its entirety, a seamless printing member, as its name implies, is a continuous sheet of plate material, typically in cylindrical form. The seamless member preferably includes a hollow supporting cylinder or sleeve that fits over a plate cylinder. Surrounding the sleeve is a base layer of material that is susceptible to imaging techniques. The base layer, for example, may be polymeric in nature and characterized by efficient, ablative absorption of infrared radiation ("IR"). Surrounding the IR base layer may be a surface coating whose affinity for ink is the opposite of that exhibited by the sleeve. By selectively removing the surface coating through ablation of the IR layer, a pattern of spots (i.e., an image) having different affinities for ink may be created.

The seamless printing member may be integral with the plate cylinder itself, or secured to the plate cylinder by any suitable means. For example, the plate cylinder may contain an array of air capillaries that extend radially through its outer surface. Air introduced from a compressed source into the interior of the cylinder is directed radially outward from the cylinder's surface, expanding the diameter of the seamless printing member to ease its loading onto the cylinder. When the printing member is fully installed, the air flow may be stopped, causing the seamless printing member to relax to a tight fit over the cylinder. The seamless printing member is then ready for imaging and printing. The seamless printing member may be imaged completely from one edge thereof to the other, or a slightly narrower imaging region may be defined that provides a left and right margin on the seamless printing member.

Despite its advantages in terms of actual printing, utilization of a seamless printing member nevertheless complicates the imaging process. Without a void segment there is no predefined area over which the writing head may be advantageously advanced. Thus, alternative imaging techniques need be developed. One approach is to place the image on the seamless member in a helical pattern. This may be accomplished by moving the writing head axially relative to the cylinder at a constant, uniform speed while the cylinder is similarly rotated at constant speed. This approach, however, is disadvantageous in that the resulting image may be skewed slightly due to the helical imaging process. Furthermore, since the image information is often provided in an x-y format (i.e., a right angle coordinate system), imaging the plate in a helical manner may impose added complexity to the imaging process.

SUMMARY OF THE INVENTION

It is an object of the present invention to provide an improved method for imaging a seamless printing member.

It is a further object of the present invention to provide improved apparatus for imaging seamless printing members.

Still another object of the invention is to provide an apparatus which lends itself to control by digital data representing an original image, such as a document, picture or pattern.

Briefly, the invention comprises a plate imaging apparatus for use in writing an image onto a seamless printing member preferably loaded onto a rotating plate cylinder. The imaging apparatus controls a writing head that moves in fixed increments in an axial direction relative to the rotating plate cylinder. The imaging apparatus also continuously receives angular position information from a detector coupled to the plate cylinder as well as digital information from an image data source. With the writing head fixed at a first axial position, the imaging apparatus preferably causes a circumferential swath of image information to be written onto the printing member based on the information from the image data source. Then, with the plate cylinder still rotating, the imaging apparatus idles the writing head and moves it to the next axial position in preparation for writing a second circumferential swath of image information. By the time the writing head reaches the second axial position and is readied for imaging, however, the starting point for the second swath is offset from the starting point of the previous swath, since the plate cylinder continued to rotate while the writing head was moved.

Rather than waiting for the cylinder to return to the same starting point as the prior swath, the imaging apparatus of the present invention begins imaging from the new starting point. That is, the spacing or gap between adjacent starting points represents a "virtual void" in the plate cylinder (i.e., an advantageous but locationally variable place in which to advance the writing head). In other words, for purposes of advancing the writing head upon completion of a swath, the imaging apparatus ignores the absence of an actual void in the plate cylinder. The length of the virtual void, moreover, will depend upon the rotational speed and the diameter of the plate cylinder as well as the time it takes to move the writing head to the next axial position. Since the imaging apparatus constantly receives angular position information from the detector, the precise length of the void is easily determined. The imaging apparatus is thus able to determine the appropriate point from the image data source that corresponds to the new starting point on the printing member.

Beginning from this new point in the digital image data, the imaging apparatus then writes a second swath around the entire circumference of the seamless printing member. Upon completing the second swath (i.e., returning to its starting point), the imaging apparatus advances the writing head through another virtual void to the next axial position. This process of idling and stepping the writing head through a sequence of virtual voids is repeated until the entire seamless printing member has been imaged.

BRIEF DESCRIPTION OF THE DRAWINGS

The above and further advantages of the invention may be better understood by referring to the following description in conjunction with the accompanying drawings, in which.

DESCRIPTION OF THE PREFERRED EMBODIMENT

Figure 1:
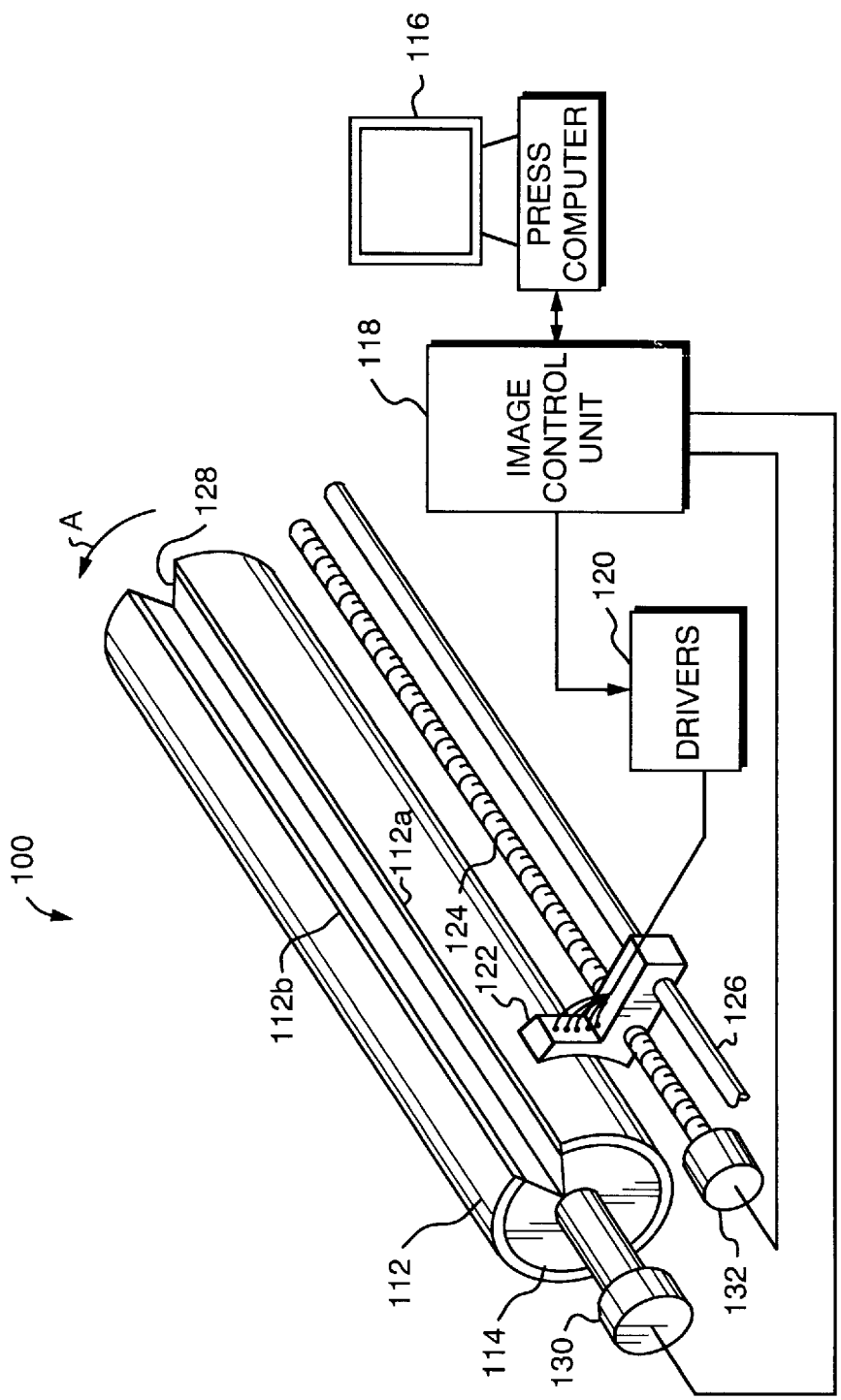
FIG. 1, previously discussed, is an isometric view of a prior art imaging device.
Figure 2:
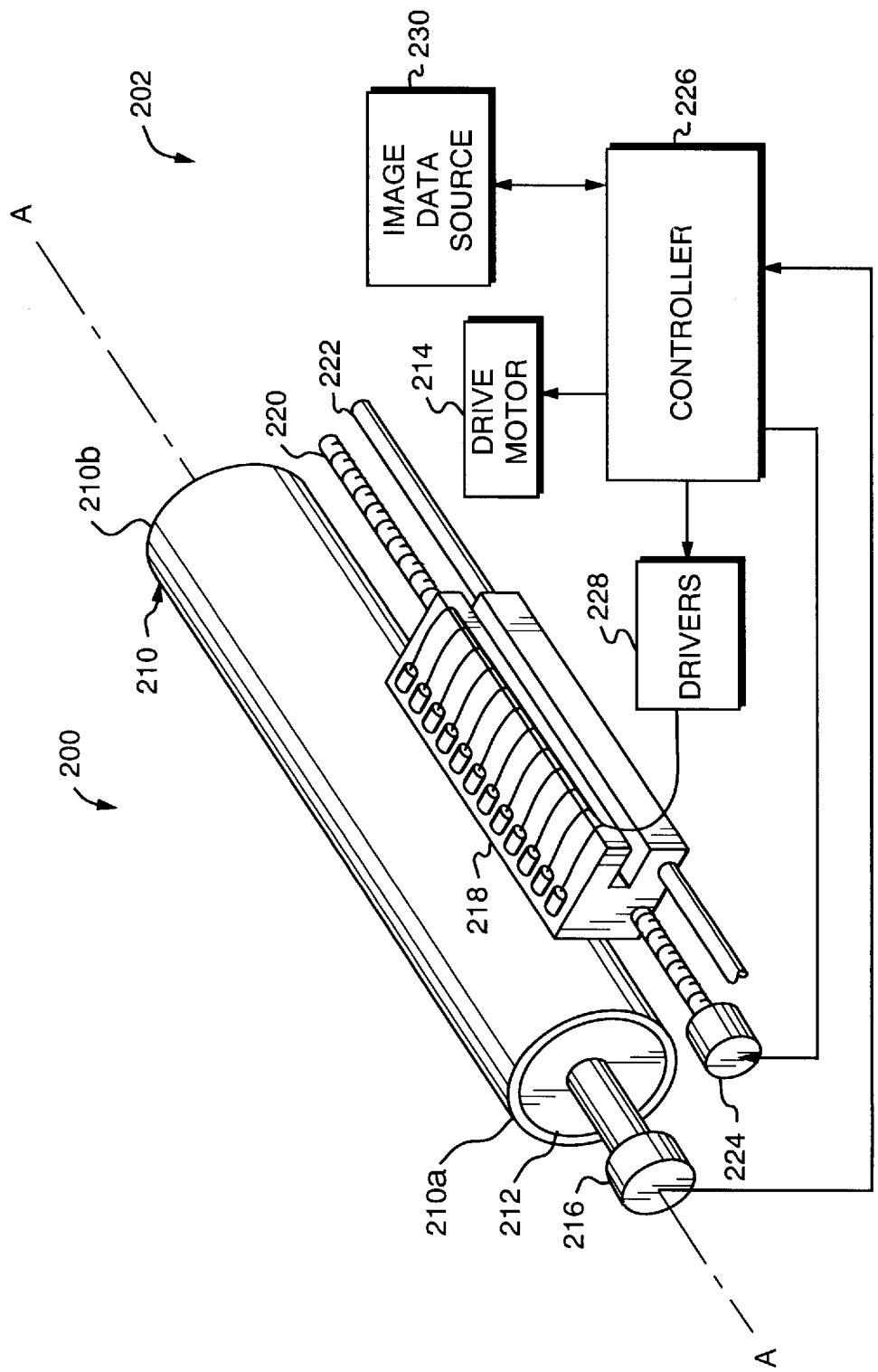
FIG. 2 is a highly schematic depiction of an imaging apparatus in accordance with the present invention.

FIG. 2 shows a printing station 200 including a plate imaging apparatus 202 in accordance with the present invention for use in writing an image onto a seamless printing member 210. As shown, the seamless printing member 210 is preferably loaded for rotation onto a plate cylinder 212 having an axis of rotation A—A. The plate cylinder 212 may be mounted within a frame (not shown) and rotated by a standard electric motor 214 (illustrated schematically) or other conventional means. Operably coupled to the plate cylinder 212 is a detector or shaft encoder 216 for continuously outputting the angular position of the rotating plate cylinder 212. In addition to angular position pulses, the encoder 216 also outputs home pulses. A home pulse is preferably a single pulse which occurs once per revolution of the cylinder 212 and serves as a marker to indicate when the cylinder 212 has completed one revolution.

A writing head 218 proximate to the seamless printing member 210 is arranged for movement relative thereto. More specifically, the writing head 218 is capable of stepwise movement preferably along a guide bar 222 that is parallel to axis A—A of the plate cylinder 212. The writing head 218 may be moved along the guide bar 222 by a stepper motor 224 that turns a lead screw 220 engaging the writing head 218. Thus, periodic rotation of the lead screw 220 moves the writing head 218 in fixed increments along the guide bar 222.

It should be understood that the imaging apparatus 200 may incorporate other devices in order to move the writing head 218 in fixed increments relative to the plate cylinder 212.

The plate imaging apparatus 202 further comprises a controller 226 for actuating a plurality of drivers 228 (e.g., sixteen) that, in turn, activate corresponding imaging devices (not shown) disposed within the writing head 218. As used herein, the term "imaging devices" includes radiation sources, ink-jet sources, electrodes and other means of producing image spots on blank printing members. The drivers 228, moreover, should be capable of operating at high speed to facilitate imaging the printing member 210 at commercially practicable rates. Suitable imaging devices and drivers are described in U.S. Pat. No. 5,385,092, which is hereby incorporated by reference in its entirety.

Axial movement of the writing head 218 relative to the plate cylinder 212 is preferably under the direction of the controller 226. That is, the controller 226 operates the stepper motor 224, thereby controlling movement of the writing head 218 relative to the plate cylinder 212. The controller 226 may also operate the drive motor 214, thereby controlling the rotation of the plate cylinder 212. Since the plate cylinder 212 typically has a high rotational inertia, the imaging process preferably, although not necessarily, occurs with the plate cylinder 212 rotating at a constant speed throughout.

In addition to operating the stepper motor 224, the drivers 228 and the drive motor 214, the controller 226 also receives data from two sources. First, the detector 216, which provides signals indicative of the angular position of the plate cylinder, is in communication with the controller 226. Thus, by receiving the signals from the detector 216 and having control over the stepper motor 224, the controller 226 "knows" the circumferential and axial position of the writing head 218 relative to the plate cylinder 212 (and, hence, the seamless printing member 210) at all times.

Second, an image data source 230 (e.g., a computer, a digital data file, etc.) provides data signals to the controller 226. The image data source 230 defines image points corresponding to points on the seamless printing member 210 where image spots are to be written. The controller 226 preferably contains the necessary control circuitry and logic to correlate the instantaneous position of the writing head 218 relative to the plate cylinder 212 (as reported by the detector 216) with the image points from the image data source 230. The controller 226, moreover, actuates the drivers 228 when the associated imaging devices reach the corresponding points opposite the seamless printing member 210. The control circuitry generally required to implement this scheme is well-known in the scanner and plotter art. A suitable design is described in U.S. Pat. No. 5,174,205, commonly owned with the present application, and hereby incorporated by reference in its entirety.

The method of imaging the seamless member 210 will now be described. First, the plate cylinder 212 is preferably rotated via the drive motor 214 at a constant speed. The controller 226 also activates the stepper motor 224 in order to position the writing head 218 at a starting location along the guide bar 222. The starting location may be slightly inside an edge 210A of the printing member 210 (e.g., the left edge as shown in FIG. 2), thereby defining a left margin (not shown). Similarly, a right margin (not shown) may be defined on the other edge 210B of the printing member 210, thereby defining an imaging region (not shown) that is somewhat narrower than the full axial length of the seamless printing member 210. Alternatively, the starting location may be aligned with the left edge 210A of the printing member 210.

Commencing at a given point along the circumference of the seamless printing member 210, the controller 226 then directs the drivers 228 to image a swath around the entire circumference of the printing member 210 in response to information received from the image data source 230. That is, the controller 226 responds to incoming image signals from the image data source 230 corresponding to the original document or picture being imaged. As a result, the image apparatus 200 produces a precise negative or positive image of that original.

The image signals may be stored as a bitmap (e.g. a data file) on a computer. Such files may be generated by a raster image processor (RIP) or other suitable means. For example, a RIP can accept input data in page description language, which defines all of the features required to be transferred on the printing member 210, or as a combination of page description language and one or more image files. The bitmaps may also be constructed to define the hue of color as well as screen frequencies and angles.

Figure 3:
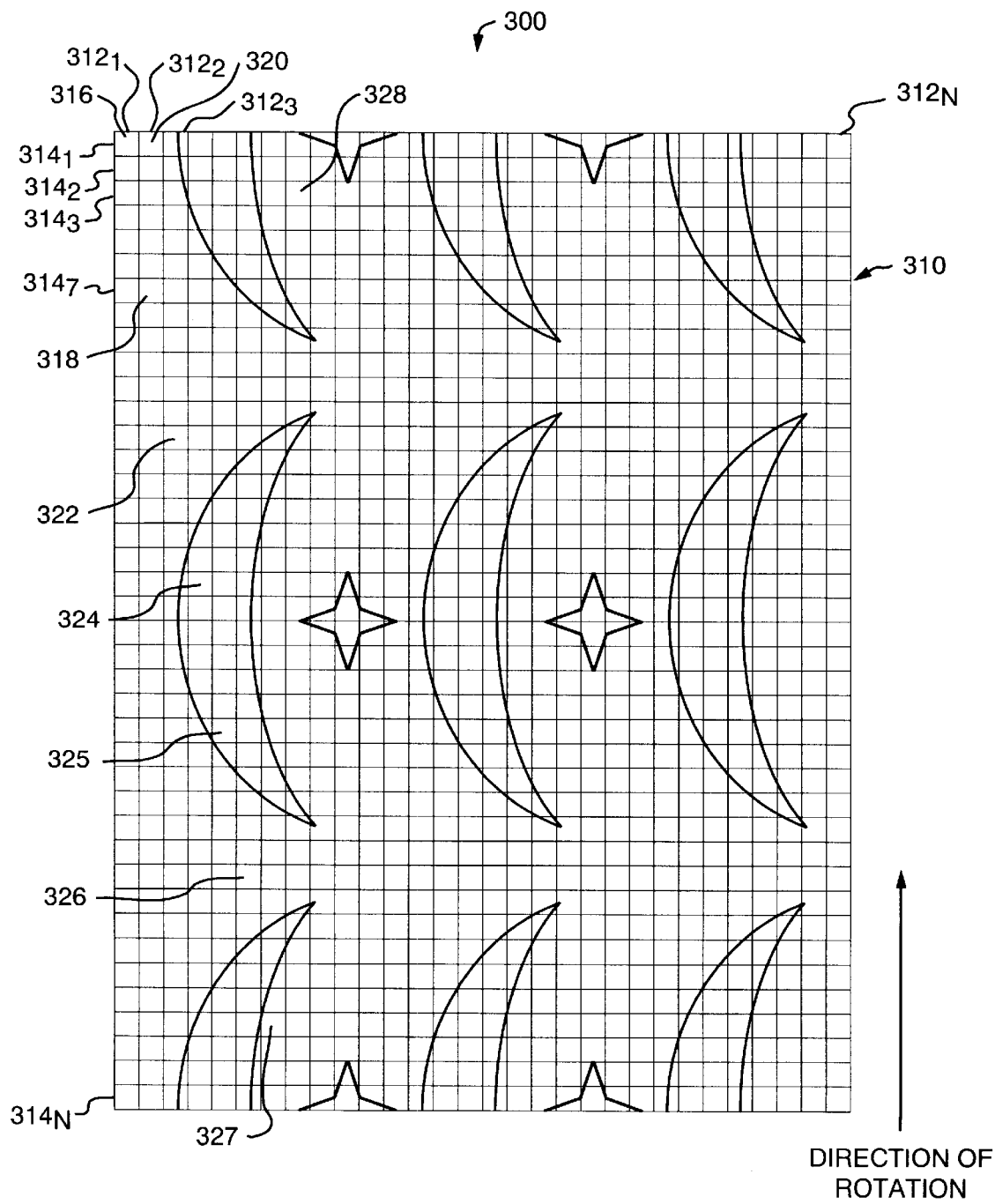
FIG. 3 is a highly schematic depiction of a bitmap to be imprinted via the imaging apparatus of the present invention.

FIG. 3 is a highly schematic representation of a bitmap 300 of a repeating image 310 to be written on a seamless printing member 210 (FIG. 2). The bitmap 300 essentially divides the image into a sequence of columns $312_1$ through $312_N$ and rows $314_1$ through $314_N$. Thus, each point on the bitmap may be located by its particular column $312_X$ and row $314_Y$ identifiers. The state of each point on the bitmap 300 may be on or off. For example, if the point is to be imaged, it may be considered "on" so that the controller 226 (FIG. 2) when reaching this point in the bitmap 300 will direct the imaging devices to write a corresponding spot on the printing member 210. As mentioned above, the bitmap 300 is preferably stored within the image data source 230 (FIG. 2) for access by the controller 226.

As described above, after indexing the writing head 218 (FIG. 2) to the starting location of the imaging region, the controller 226 accesses the bitmap 300 from the image data source 230. The controller 226 then selects an initial starting point (e.g., 316) within the first column $312_1$ preferably corresponding to row $314_1$. With the plate cylinder 212 rotating at constant speed, the controller 226 then directs the imaging devices via the drivers 228 to image a circumferential swath onto the printing member 210, based on the information from the bitmap 300. That is, the controller 226 successively accesses the information in each row $314_1$ through $314_N$, from the first column $312_1$ and writes this information onto the printing member 210. The controller 226 correlates the information being written onto the seamless member 210 from the bitmap 300 by utilizing, inter alia, the angular position information received from the detector 216.

Since the printing member 210 is seamless, the imaging apparatus 200 is able to image a circumferential swath all the way back to the starting point 316 of the swath. In other words, the information contained at column $312_1$ and row $314_N$ (i.e., the last row) is written onto the seamless member 210 directly above the information corresponding to the starting point 316. Having completed the first swath, the imaging apparatus 200 is now ready to image the second swath (i.e., the information corresponding to column $312_2$ from the bitmap 300).

First, the controller 226 idles the imaging devices. Next, the controller 226 utilizes the stepper motor 224 to move the writing head 218 to the next axial position. When the writing head 218 reaches the next axial position, the controller 226 is ready to resume the imaging process. Nevertheless, since the plate cylinder 210 continued to rotate while the writing head 218 was being indexed to the second axial position, the imaging head 218 will no longer be adjacent to the prior starting point 316 when it is ready to resume imaging. That is, the writing head 218 will not be directly over the point on the printing member 210 that corresponds to row $314_1$ and column $312_2$ on the bitmap 300.

Assuming the plate cylinder 212 has a diameter of 180 millimeters and is rotating at 170 rpm and that 50 milliseconds are need to increment the writing head 218, the plate cylinder 212 will have rotated approximately 50° while the writing head 218 was being indexed. Accordingly, the position of the writing head 218 will correspond to a new point on the bitmap 300 that is offset from the prior starting point 316. By virtue of the position signals constantly received from the detector 216, however, the controller 226 "knows" which point in the bitmap 300 corresponds to the new position of the imaging head 218. For example, the new point may correspond to point 318, which is in row $314_7$, as opposed to row $314_1$ for the prior starting point 316.

Rather than wait for the writing head 218 to pass over the point adjacent to the prior starting point 316, e.g., point 320, before resuming the imaging process, the controller 226 preferably begins imaging from the new starting point 318. The controller 218 thus directs the imaging devices to write the corresponding image information from column $312_2$ beginning at row $314_7$ (the new starting point 318) moving successively to row $314_N$ and then continuing with rows $314_1$ through $314_6$.

The circumferential gap between axially adjacent starting points 316, 318 is presumed by the controller 226 to be a "virtual void" on the plate cylinder 212. That is, the controller 226 advances the writing head 218 to the next axial location upon completion of the first swath. For imaging purposes, the controller 226 images a complete swath around the entire circumference of the cylinder 212 beginning at the new starting point 318.

After completion of the second swath, the imaging devices are again idled and the writing head 218 is stepped through another virtual void in preparation of imaging the third swath. The writing head 218 will now be above the seamless printing member 220 at yet another starting point relative to the bitmap 300, for example, point 322. The new starting point 322 is similarly offset from the prior starting point 318 of the second swath. Nonetheless, by virtue of the signals received from the detector 216 and the ability of the controller 226 to correlate instantaneous writing-head position with the corresponding bitmap location, the controller 226 is able to resume imaging from the new starting point 322. This process is repeated, thereby defining a series of offset starting points (e.g., 324–328), until the entire imaging region of the seamless printing member 210 has been imaged. The various starting points 316, 318, 322, 324–328, etc. form a lazy spiral around the cylinder 212.

Figure 4:
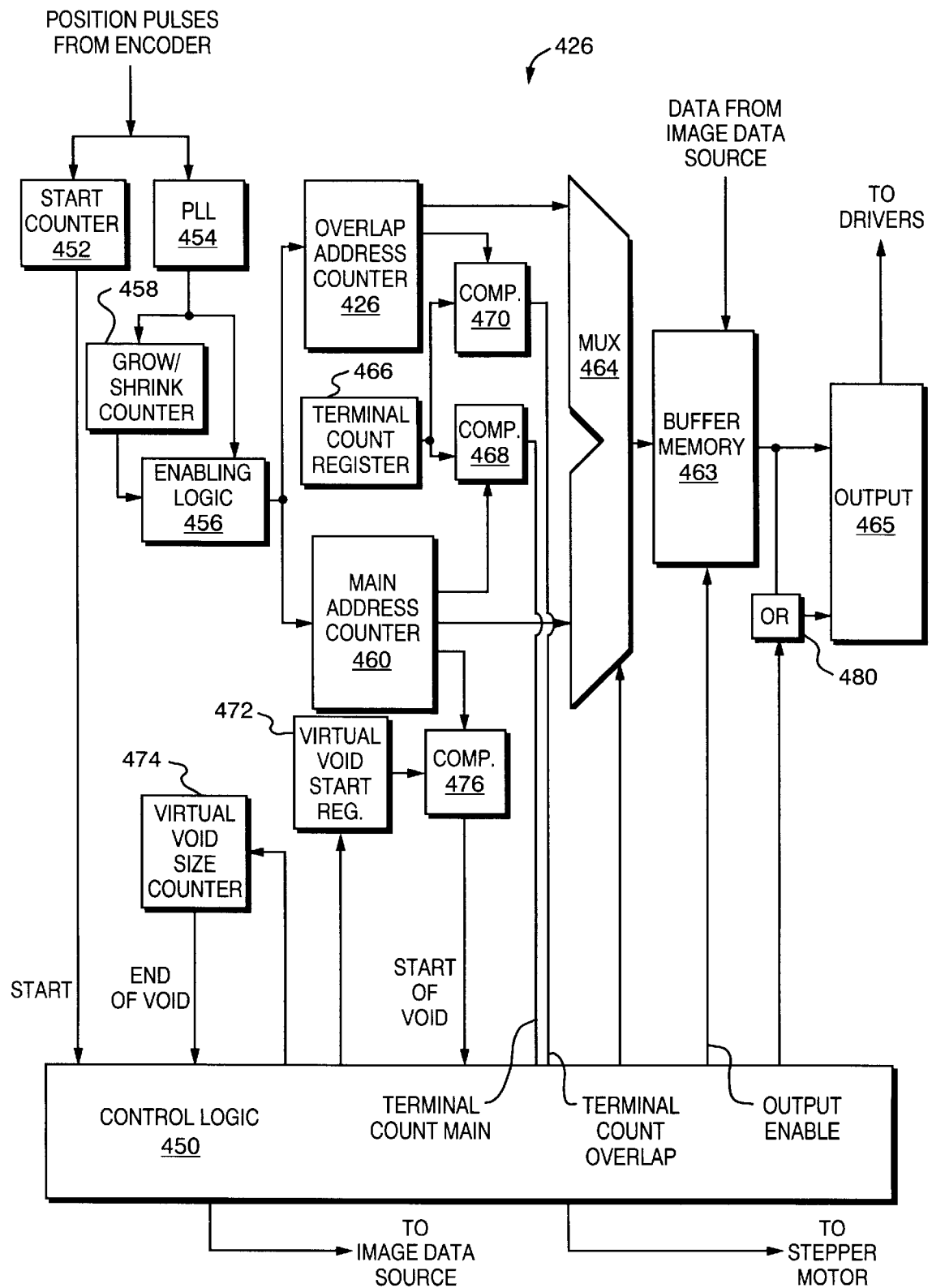
FIG. 4 is a block diagram of a controller in accordance with the present invention.

FIG. 4 is a highly schematic block diagram of a preferred form of controller 426, similar to the controller 226 of FIG. 2. The controller 426 includes, among other elements, circuitry and programming defining control logic block 450, a start counter 452 and a Phase Locked Loop Circuit ("PLL") 454. Angular position pulses and home pulses received from the encoder 216 (FIG. 2) are provided to the start counter 452 and PLL 454. The start counter 452 counts position pulses output from the encoder 216 starting from the home pulse. When the start counter 452 reaches a preprogrammed start value, it issues a start message to the control logic 450. Thus, by simply changing the size of the start value within the start counter 452, the operator can synchronize issuance of the start message with any circumferential position of the cylinder 212 (FIG. 2).

The PLL 454 is used to increase the resolution of the encoder 216 (FIG. 2). More specifically, the PLL 454 takes a relatively low resolution angular position signal produced by the encoder 216 (e.g., 5000 position pulses per revolution) and yields an angular position signal having a substantially enhanced resolution (e.g., 36,000 position pulses per revolution). The PLL 454 preferably includes programmable dividers so that the operator can adjust the number of position pulses output by the PLL 454 per revolution of the cylinder 212.

The output of the PLL 454, in turn, is provided to an enabling logic 456 and at least one grow/shrink counter 458.

The enabling logic 456 essentially acts as a gate passing the position pulses from the PLL 454 to a main address counter 460 and an overlap address counter 462. The main address counter 460 preferably contains a sequence of buffer memory address pointers. Each address pointer corresponds to a location in a buffer memory 463 containing image data to be placed on the seamless printing member 210. Each location, moreover, may contain sixteen bits, one for each imaging device. As each position pulse is received from the enabling logic 456, the main address counter 460 increments or scrolls through its sequence of address pointers. Thus, each position pulse or sequence of pulses may be associated with a specific entry of image data (e.g., a pixel) stored in the buffer memory 463.

It should be understood that by adjusting the number of position pulses output by the PLL 454 per revolution, the operator may provide some adjustment to the circumferential size of the image being placed circumferentially on the seamless printing member 210.

As each address pointer in the main address counter 460 is accessed, it is applied to the buffer memory 463 via a multiplexer 464. Assuming that the control logic 450 has provided an output enable message to the buffer memory 463, the image data in the memory location corresponding to that address pointer is transferred to an output 465. The image data may then be transmitted to the drivers 228 (FIG. 2) which, in turn, activate the imaging devices in accordance with the image data that was read out of the buffer memory location.

The grow/shrink counter 458 allows the operator to "fit" the image circumferentially around the circumference of the seamless printing member 210 (FIG. 2). In particular, the grow/shrink counter 458 preferably counts position pulses received from the PLL 454. When the number of position pulses equals a programmable count value, the grow/shrink counter 458 issues an interrupt message to the enabling logic 456. In response to the interrupt message, the enabling logic 456 temporarily suspends the transmission of position pulses from the PLL 454 to the main address counter 460. By interrupting the transmission of position pulses, the main address counter 460 is temporarily prevented from scrolling to the next address pointer, despite the continued rotation of the cylinder 212 (FIG. 2). Since the main address counter 460 is not incremented, the image data corresponding to the subsequent address pointer(s) is not read out of the buffer memory 463 and provided to the drivers 228. This effectively increases the separation between sequences of image spots being placed on the seamless printing member 210 by the imaging devices.

By modifying the programmable count value, the operator may adjust the "fit" of the image to the seamless printing member 210 such that the last image dot placed during each swath will be adjacent to the first image dot. For example, assume that the grow/shrink counter 458 is initially programmed such that for every one hundred position pulses, the grow/shrink counter 458, via the enabling logic 456, suspends the transmission of four position pulses to the main address counter 460. The operator may effectively "spread" the image over a greater circumferential area by simply adjusting the grow/shrink counter 458 so that a smaller number of position pulses (e.g., 50) are counted between interrupt messages. This increases the separation between sequences of image spots, thereby increasing the circumferential extent of the image without modifying any image information. That is, the image is enlarged circumferentially ("grown") about the seamless printing member 210.

Similarly, the image may be caused to "shrink" circumferentially by increasing the preselected count value.

Specifically, the grow/shrink counter 458 preferably starts out with some positive count value. By further increasing the programmable count value, the number of position pulses that are counted between each interrupt message is also increased. This causes fewer interrupt messages to be sent per revolution of the cylinder 212 and thus reduces the separation between sequences of image spots. As a result, the operator may effectively reduce the circumferential size of the image, once again without altering intrinsic image information.

It should be understood that the number of position pulses that are to be suspended may be contained within the interrupt message. It should be further understood that the controller 426 may contain multiple grow/shrink counters each with their own sensitivities. For example, a coarse grow/shrink counter may be provided in order to adjust the image in ¼ image dot increments whereas a fine grow/shrink counter may adjust the image in ⅛ to 1/16 image dot increments.

The controller 426 also includes a terminal count register 466 that contains a number which is preferably associated with the total number of image pixels that make up one complete image swath. Specifically, the terminal count register 466 may contain a value equal to the position of the last address pointer in the main address counter 460. For example, if the main address counter 460 includes address pointers stored in positions 0 through 64,000, the value loaded into the terminal count register 466 would be 64,000. This value is preferably provided by the terminal count register 466 to first and second comparators 468, 470, respectively.

The first comparator 468 also receives the position of the main address counter 460 as it continuously scrolls through each address pointer. The second comparator 470 continuously receives the position of the overlap address counter 462. When the first comparator 468 determines that the main address counter 460 has accessed the address pointer in the highest position (e.g., 64,000), it preferably issues a terminal count message to the control logic 450. As explained below, this may, but more likely will not, correspond with the last address pointer to be accessed by the main address counter 460 during a given image swath.

The control logic 450 may also include a virtual void start register 472 and a virtual void size counter 474. The virtual void start register 472 contains a value equal to the position of the last address pointer that is to be accessed by the main address counter 460 for a given swath of image data. This address pointer position is provided by the virtual void start register 472 to a third comparator 476 which also continuously receives the position of the main address counter 460. When the main address counter 460 rolls over to the last address pointer to be accessed for a given swath, the third comparator 476 detects a match and, in response, issues a virtual void start message to the control logic 450.

The virtual void size counter 474 may contain a preprogrammed value that corresponds to the circumferential size of the virtual void. That is, the value may equal the circumferential displacement of the cylinder 212 that occurs while the writing head 218 is incremented to its next axial position. The virtual void size counter 474 is activated by the control logic 450 when it receives the start of void message from the third comparator 476. When the virtual void size counter 474 determines that the cylinder 212 has moved through the virtual void (e.g., by way of a timer or counting position pulses), an "end of void" message is preferably transmitted by the virtual void size counter 474 to the control logic 450.

At this point, the writing head 218 should be in position to begin imaging the next swath.

We now proceed to describe the operation of the controller 426 with reference to FIGS. 2 and 4. Image data corresponding to the first image swath to be placed on the seamless printing member 210 is received from the image data source 230 and preferably copied into the buffer memory 463. The main address counter 460 which contains address pointers 0 through N (e.g., 64,000), is preferably positioned at the address pointer located at position 1 and the value in the virtual void start register is set to 0. Similarly, the overlap address counter 462 preferably contains address pointers 0 through N and is also positioned at position 1. The value contained in the terminal count register 466 is then preferably set to the highest address pointer position, in this case 64,000.

Next, the operator preferably adjusts the values contained in the PLL 454 and the grow/shrink counter 458 so that the image data will be properly sized to the circumference of the seamless printing member 210. In particular, theoretical values may be initially programmed into the PLL 454 and the grow/shrink counter 458. A test run or runs may then be performed and these values adjusted as necessary. The operator also sets the value in the virtual void size counter 474 to correspond to the time needed to move the writing head 218 from one axial location to the next. In addition, the operator sets the value in the start counter 452 to position the start of the imaging process circumferentially on the seamless printing member 210.

When the start message is received from the start counter 452, the control logic 450 transmits an output enable message to the buffer memory 463 and allows the main and overlap address counters 460, 462 to start incrementing through the address pointers. Starting with the address pointer corresponding to position 1, the main address counter 460 increments through each address pointer in response to the position pulses received from the enabling logic 456. These address pointers are then applied to the buffer memory 463. The overlap counter 462 is also incremented but the corresponding address pointers are preferably not utilized. As previously described, image data stored in the corresponding memory locations are transferred to the output 465 and provided to the drivers 228 for operating the imaging devices. Accordingly, as the main address counter 460 scrolls through the address pointers, the corresponding image data is placed on the seamless printing member 210 by the imaging devices.

When the main address counter rolls over to the address pointer at position 64,000, the first comparator 468 determines that the main address counter 460 has accessed the image data corresponding to the highest address pointer position and issues a terminal count message to the control logic 450. Immediately thereafter, the start counter 452 should determine that the cylinder 212 has rotated one complete revolution and, in response, issue another start message to the control logic 450. Upon receipt of the start message, the control logic 450 preferably resets the main address counter 460 to position 0. By having received the start message immediately after the terminal count message, the control logic 450 "knows" that the imaging apparatus 202 has properly placed the image data around the circumference of the seamless printing member 210.

Upon resetting the main address counter 460 to position 0, the comparator 476 associated with the virtual void start register 472 senses a match and issues a start of void message to the control logic 450. Accordingly, the control logic 450 directs the writing head 218 to be incremented to the second axial location in preparation of placing the second image swath on the seamless printing member 210. Specifically, the control logic 450 retracts the output enable message, thereby preventing image data from being supplied to the drivers 228. This effectively idles the drivers 228. Next, the control logic 450 activates the virtual void size counter 474 and directs the stepper motor 224 to increment the writing head 218 to the second axial position. The control logic 450 may also direct the image data source 230 to load the buffer memory 463 with the image data corresponding to the second swath. Meanwhile, since position pulses continue to be provided to the main address counter 460 by the enabling logic 456, the main address counter 460 continues to scroll through its list of address pointers.

When the virtual void size counter 474 determines that the cylinder 212 has rotated through the virtual void, it issues an end of void message to the control logic 450. The control logic 450 then immediately loads the virtual void start register 472 with the present position of the main address counter 460 (e.g., position 20,000). The control logic 450 also re-issues the output enable message to the buffer memory 463 so that, with the next position pulse, the main address counter 460 will increment to the next address pointer (e.g., position 20,001) and the image data corresponding to this position in the buffer memory 463 will be read out and provided to the drivers 228. As described above, the main address counter 460 then increments through each address pointer and the corresponding image data is incrementally provided to the drivers 228 for operating the imaging devices.

The first comparator 468 preferably determines a match with the value contained in the terminal count register 466 when the main address counter 460 again reaches the address pointer located at the highest position (e.g., position 64,000). In response, the first comparator 468 issues a terminal count message to the control logic 450. Immediately thereafter, a start message should be received from the start counter 452 and the main address counter 460 is reset (e.g., returned to position 0) and imaging continues from this position in the main address counter 460. When the main address counter 460 reaches the last address pointer for this swath (e.g., position 20,000), a match should be determined by the virtual void start register 472 and a start of void message sent to the control logic 450. In response, the drivers 228 are idled, the writing head 218 incremented to the next axial position and imaging resumed as previously described. This process is preferably repeated until the entire imaging area of the seamless printing member 210 is imaged.

During the imaging process, the angular encoder 216 may be subject to vibration due to the rotation of the cylinder 212. In addition, the output of the PLL 454 may be affected by noise inherent in the imaging apparatus 202 and its environment. As a result, the position signal output by the PLL 454 may be dynamically distorted during the imaging process. One possible result of this distortion is that the circumferential extent of the image being placed on the seamless printing member 210 might be changed. That is, the distortion may increase or decrease the circumferential length of the image by distorting the position pulse signal. An increase in image length may be detected if the control logic 450 receives the start message prior to receiving the terminal count message. In this case, the writing head 218 will have reached the circumferential position at which image data corresponding to address pointer position 0 should be placed on the seamless printing member 210. Nonetheless, the main address counter 460 will not have accessed the address pointer(s) corresponding to the highest position(s). In other words, there will be address pointers in the main address counter 460 that have yet to be accessed and applied to the buffer memory 463, despite the main address counter 460 being reset to position 0 in response to the start message.

There are several possible responses to this occurrence. For example, the non-accessed address pointers simply may be ignored, the main address counter 460 reset to the zero position and imaging continued. Alternatively, the image data corresponding to these unaccessed address pointers may be applied to the output 465 and image data placed where the data from the first sequence of positions would otherwise be placed on the seamless printing member 210.

In the preferred embodiment, the image data corresponding to the address pointers that overlap is subject to an OR operation, indicated by block 480, and the result provided to the drivers 228 for imaging the seamless printing member 210. This may be best explained through an example. Assume that there are 0 through 64,000 positions in the main address counter 460, each containing an address pointer to a location in buffer memory 463. Assume further that imaging commenced with the main address counter 460 at position 10,000 and that the start message was received when the main address counter 460 was only at position 59,999. That is, the writing head 218 has returned to the circumferential point at which image data corresponding to position 0 should be placed, despite the fact that image data corresponding to positions 60,000 through 64,000 have yet to be applied to the drivers 228.

In response, the control logic 450 preferably causes the image data associated with the corresponding positions (e.g., 0 to 4000 in the main address counter 460 and 60,000 to 64,000 in the overlap address counter 462) to be overlapped. As previously described, the overlap counter 462 contains a sequence of address pointers that is identical to the sequence contained in the main address counter 460. The overlap counter 462, moreover, unlike the main address counter 460, is not reset to the zero position each time the control logic 450 receives the start message. Thus, upon receiving the next position pulse after the start message, the main address counter 460 and the overlap address counter 462 access the address pointers in positions 0 and 60,000, respectively. The control logic 450 directs the multiplexer 464 to apply both of these address pointers to the buffer memory 463. The image information corresponding to each address pointer is then read out and the OR operation 480 is applied thereto. The modified image data resulting from the OR operation 480 is then preferably transmitted to the output 465 for receipt by the drivers 228.

By applying the OR operation 480 to these two entries of image data, the controller 426 effectively causes the drivers 228 and imaging devices to place a spot on the seamless printing member 210 if the image data corresponding to either position 60,000 or 0 or both is a write function. Only if the image data corresponding to both position 60,000 and 0 is blank will the result of the OR operation 480 cause the imaging devices to leave the corresponding point on the seamless printing member 210 to remain blank. This process is repeated such that the image data corresponding to position 1 as accessed by the main address counter 460 and the image data corresponding to position 60,001 as accessed by the overlap address counter 462 is subject to the OR operation 480 and the result provided to the drivers 228, and so on.

When the overlap address counter 460 (as opposed to the main address counter 460 during "normal" operation)

reaches the address pointer at position 64,000, the second comparator 470 preferably issues a terminal count message to the control logic 450. This will occur because the terminal count register 466, which is not dependent upon the "distorted" signal received from the PLL 454, will have determined that the overlap address counter 462 has now accessed the address pointers at the highest position. Accordingly, all of the address pointers that the main address counter 460 failed to access prior to being reset to the zero position will now have been accessed.

At this point, the control logic 450 preferably synchronizes the position of the overlap address counter 462 (e.g., 64,000) to that of the main address counter 460 (e.g., 4000). In addition, the control logic 450 directs the multiplexer 464 to apply the address pointers accessed by the main address counter 460 to the output 465. That is, the control logic 450 disables the OR operation 480. When the main address counter 460 finally rolls into the address pointer at position 9,999 the entire swath will have been imaged.

Upon reaching this position, the comparator 476 associated with the virtual void start register 472 will sense a match and issue a start of void message to the control logic 450. In response, the control logic 450 prepares to image the next swath of the seamless printing member 210. More specifically, the control logic 450 retracts the output enable message, idling the drivers 228, and starts the virtual void size counter 474. The control logic 450 also directs the stepper motor 224 to increment the writing head 218. When the virtual void size counter 474 transmits the end of void message, the control logic 450 loads the current position of the main address counter 460 into the virtual void start register 472 and re-issues the output enable message to the buffer memory 463. The address pointers incrementally accessed by the main address counter 460 are then applied to the buffer memory 463, copied to the output 465 and used to activate the drivers 228 and imaging devices.

If the distortion to the output of the PLL 454 results in the main address counter 460 accessing the address pointer at highest position (e.g., 64,000) well before the cylinder 212 has returned to the starting position, the control logic 450 preferably suspends imaging until the start message is received. This occurrence would be detected by the control logic 450 if the terminal count message is received, but no start message is received. In this case, the main address counter 460 would have scrolled through the address pointer stored at the highest position and the corresponding image data placed on the seamless printing member 210 before the cylinder 212 has returned to the start position. In this case, the control logic 450 preferably retracts the output enable message and awaits the occurrence of the start message. The imaging process is then continued as previously described.

It should be understood that the controller 426 may comprise a series of software instructions, a hardware circuit or a combination of both.

It should be further understood that the imaging apparatus of the present invention can operate on its own, functioning solely as a platemaker, or can be incorporated directly into a lithographic printing press. In the latter case, printing may commence immediately after application of the image to a blank plate, thereby reducing press set-up time considerably.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An imaging apparatus for use in generating a circumferential image swath for a rotatable seamless printing member, the image swath comprised of a plurality of pixels including a first pixel and a last pixel, the imaging apparatus comprising:

means for providing gross and fine adjustment to a circumferential size of the swath, the providing means configured to allow the last pixel of the swath to be positioned directly adjacent to the first pixel of the swath.

2. The imaging apparatus of claim 1 further comprising:

means for receiving enhanced angular position information relative to rotation of the seamless printing member;

a main address counter having a plurality of address pointers, the main address counter configured to scroll sequentially through the plurality of address pointers in response to the received enhanced angular position information; and means for accessing image data as each address pointer in the main address counter is reached.

3. The imaging apparatus of claim 2 wherein the means for providing gross and fine adjustment comprises a grow/shrink counter and enabling logic each receiving enhanced angular position information, the enabling logic transmitting the enhanced angular position information to the main address counter, further wherein the grow/shrink counter periodically issues an interrupt message to the enabling logic causing the enabling logic to temporarily suspend the transmission of enhanced angular position information to the main address counter, altering the circumferential extent of the image.

4. An imaging apparatus for use in imaging a seamless printing member in response to an image data source, the seamless printing member loaded onto a plate cylinder rotatable about an axis and including a detector for continuously providing angular position information and home pulses, the imaging apparatus comprising:

a writing head proximate to the seamless printing member;

means for moving the writing head in fixed increments parallel to the axis of the plate cylinder;

at least one imaging device associated with the writing head for producing an image on the seamless printing member; and a controller comprising:

control logic operatively connected to the means for moving the writing head and to the at least one imaging device;

a start counter for issuing a start message in response to each home pulse;

means for enhancing the angular position information provided by the detector;

a main address counter having a plurality of address pointers, the main address counter configured to scroll sequentially through the plurality of address pointers in response to the enhanced angular position information;

means for accessing image data from the image data source as each address pointer in the main address counter is reached;

means for providing the accessed image data to the at least one imaging device; and means for providing gross and fine adjustment to a circumferential size of a swath placed on the seamless printing member so that a last pixel of the swath may be positioned directly adjacent to a first pixel of the swath.

5. The imaging apparatus of claim 4 wherein the image has a circumferential extent and the means for providing gross and fine adjustment comprises a grow/shrink counter and enabling logic each receiving enhanced angular position information, the enabling logic transmitting the enhanced angular position information to the main address counter, and further wherein the grow/shrink counter periodically issues an interrupt message to the enabling logic causing the enabling logic to temporarily suspend the transmission of enhanced angular position information to the main address counter to thereby alter the circumferential extent of the image.

6. The imaging apparatus of claim 5 wherein the controller further comprises means for correcting displacement of a circumferential image swath resulting from distortion in the enhanced angular position information received by the main address counter.

7. The imaging apparatus of claim 6 wherein the means for enhancing angular position information is a phase locked loop circuit.

8. A method for responding to distortion during imaging of a seamless printing member loaded onto a plate cylinder rotatable about an axis, utilizing a buffer memory having a plurality of memory addresses configured to store a swath of image data and a source of position pulses indicating rotation of the seamless imaging member, the source of position pulses subject to distortion, the method comprising the steps of:

issuing a start message once per revolution of the seamless imaging member;

providing a first means for sequentially identifying, from a low order to a high order, each memory address of the buffer memory in response to the position pulses;

resetting the first identifying means to the low order in response to the start messages;

providing a second means for sequentially identifying each memory address of the buffer memory in response to the position pulses which is not reset in response to the start messages; and enabling an OR operation acting upon the image data simultaneously identified by the first identifying means and the second identifying means when the first identifying means is reset before identifying the memory address corresponding to the high order.

9. In a system for imaging a seamless printing member loaded onto a plate cylinder rotatable about an axis, the system having (i) a source of position pulses indicating rotation of the seamless imaging member, the source of position pulses subject to distortion, (ii) a buffer memory having a plurality of memory addresses configured to store a swath of image data, and (iii) a writing head having at least one imaging device for producing an image on the seamless printing member, a controller for use in responding to the distortion during imaging of the seamless printing member, the controller coupled to the source of position pulses, the buffer memory, and the writing head, the controller comprising:

means for issuing a start message once per revolution of the seamless imaging member;

a main address counter having a set of address pointers, including a lowest address pointer and a highest address pointer, each address pointer identifying a corresponding memory address of the buffer memory, the main address counter configured to scroll sequentially through the address pointers in response to the position pulses;

means, responsive to the start messages, for returning the main address counter to its lowest address pointer;

an overlap address counter having a set of address pointers, including a lowest address pointer and a highest address pointer, each address pointer identifying a corresponding memory address of the buffer memory, the overlap address counter configured to scroll sequentially through the address pointers in response to the position pulses; and means for enabling an OR operation to the image data simultaneously identified by the main address counter and the overlap address counter when the main address counter is returned to its lowest address pointer before scrolling through its highest address pointer.

10. The controller of claim 9 further comprising means for synchronizing the overlap address counter with the main address counter and for disabling the OR operation in response to the overlap address counter scrolling through its highest address pointer.

11. The controller of claim 10 further comprising an output coupled to the buffer memory and the OR operation for transferring image data stored in the memory address identified by the main address counter or the OR operation, when enabled, to the at least one imaging device.

12. The controller of claim 11 wherein the main address counter starts scrolling from any given main address pointer.

13. The controller of claim 12 further comprising:

a first comparator configured to issue a start of void message when the main address counter has scrolled through the address pointer immediately prior to the given starting address pointer; and means for suspending the transfer of image data by the output and for moving the writing head to the next increment in response to the start of void message.

14. The controller of claim 13 further comprising means for resuming the transfer of image data by the output starting from a new main address pointer coinciding with the writing head reaching the next increment.

* * * * *